(12) United States Patent  
Hooper et al.

(10) Patent No.: US 8,396,591 B2
(45) Date of Patent: Mar. 12, 2013

(54) SYSTEM AND METHOD FOR DATA COLLECTION AND ANALYSIS USING ROBOTIC DEVICES

(75) Inventors: Jeffrey L. Hooper, Colleyville, TX (US); Thomas Owen Howard, Colleyville, TX (US)

(73) Assignee: Valbrea Technologies, Inc., Addison, TX (US)

( * ) Notice: Subject to any disclaimer, the term of this patent is extended or adjusted under 35 U.S.C. 154(b) by 742 days.

(21) Appl. No.: 12/489,676

(22) Filed: Jun. 23, 2009

(65) Prior Publication Data

US 2009/0326709 A1 Dec. 31, 2009

Related U.S. Application Data

(60) Provisional application No. 61/075,382, filed on Jun. 25, 2008.

(51) Int. Cl.
*G06F 19/00* (2006.01)
*G05D 1/00* (2006.01)

(52) U.S. Cl. .................................................... 700/245

(58) Field of Classification Search .............. 700/245, 700/250, 253, 255, 257–259; 701/7, 11, 701/23, 400, 408, 409
See application file for complete search history.

(56) References Cited

U.S. PATENT DOCUMENTS

| 7,002,470 | B1 * | 2/2006 | Miao .................... 340/539.22 |
| 7,149,611 | B2 | 12/2006 | Beck et al. |
| 7,456,596 | B2 | 11/2008 | Goodall et al. |
| 2006/0111811 | A1 * | 5/2006 | Okamoto et al. ............ 700/214 |

OTHER PUBLICATIONS

Mobilerobots, Inc., "PatrolBot and Training Factory User Guide"—Version 4, Jun. 2007.
Deyle, Travis, "Geosystems Situational Awareness Mast (aka Zippermast)", Dec. 22, 2008.

* cited by examiner

*Primary Examiner* — Mary Cheung
(74) *Attorney, Agent, or Firm* — Patterson & Sheridan, LLP

(57) ABSTRACT

A system, method and computer program product for data collection and analysis using robotic devices. The system comprises creating a map of a facility, loading at least one position and at least one task onto a robotic device, autonomously navigating the robotic device to the at least one position to collect data, sending the data to a database for storage, processing and analyzing the data by a server, and presenting analysis of the data to a user.

14 Claims, 9 Drawing Sheets

300

SYSTEM AND METHOD FOR DATA COLLECTION AND ANALYSIS USING ROBOTIC DEVICES

CROSS REFERENCE TO RELATED PATENT APPLICATION

This application claims the benefit of U.S. Provisional Application No. 61/075,382, filed Jun. 25, 2008, entitled "APPARATUS, SYSTEM AND METHOD FOR PROVIDING MOBILE DATA COLLECTION AND ANALYSIS," the entire content of which is incorporated herein by reference.

BACKGROUND OF THE INVENTION

1. Field of the Invention

The present invention relates generally to electronic systems and apparatuses, and more particularly, to a system, a method, and a computer program product for data collection and analysis using robotic devices.

2. Description of the Related Art

Robotic devices have been used in a variety of applications. For example, robotic devices are used in a situation awareness context to provide conditions of a particular area or site. Many robotic devices are controlled remotely by a user to collect data, but they lack the ability to autonomously navigate to collect data. Also, current robotic devices lack the ability to provide analysis of the collected data at the time the devices are deployed to provide a real-time perspective of the conditions. Therefore, a need exists for robotic devices that autonomously collect data from a particular area or site and analyze the collected data in real-time to provide a complete and holistic view of the area or site.

SUMMARY OF THE INVENTION

The present disclosure provides a system, method, and a computer program product for data collection and analysis using robotic devices. The method for data collection and analysis using robotic devices comprises creating a map of a facility, loading at least one position and at least one task onto a robotic device, and autonomously navigating the robotic device to the at least one position to collect data. Alternatively, the at least one position and the at least one task of a robotic device may be controlled in real-time to collect data. The method further comprises sending the collected data to a database for storage, processing and analysis of the data by a server, and presenting analysis of the data to a user.

A system for data collection and analysis using robotic devices is provided in accordance with another embodiment of the present disclosure. The system comprises a movable robotic device for collecting data in a facility, a data processing system for communication with the robotic device, a server for processing and analyzing the data, and a database for storing the data. The robotic device comprises a mobile platform for management and controlling operations of the robotic device, at least one sensor for collecting data, and/or a camera for collecting at least one image of at least one item in the facility, and an extendable mast for positioning the at least one sensor and the camera to collect data and at least one image.

A computer program product comprising computer implemented instructions is also provided. The computer program product comprises instructions for creating a map of a facility, loading at least one position and at least one task onto a robotic device, autonomously navigating the robotic device to the at least one position to collect data, sending the data to a database for storage, processing and analyzing the data by a server, and presenting analysis of the data to a user.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

Figure 1:
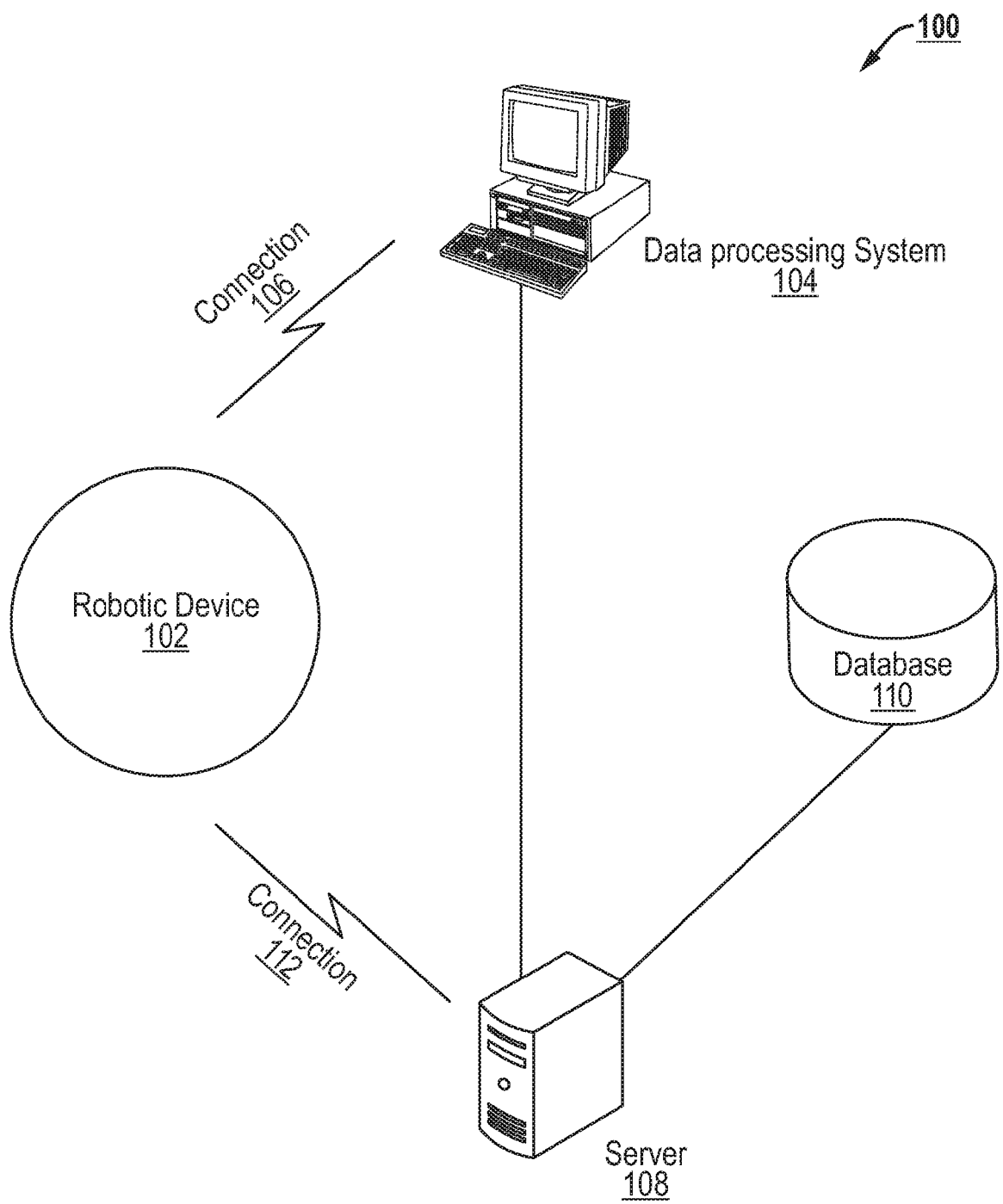
FIG. 1 is a diagram illustrating a system for data collection and analysis using robotic devices in accordance with one embodiment of the present invention.

Referring to FIG. 1, a system for real-time data collection and analysis using robotic devices is depicted in accordance with one embodiment of the present disclosure. System 100 comprises at least one robotic device 102 capable of independent navigation and movement within a facility or a specific location for collecting desired data. The facility or location, for example, may be a shipyard with containers, a data center, a warehouse, a laboratory, or any other equivalents applicable according to the present invention. It will be understood by one skilled in the art that the facility or locations where the present invention may be deployed are unlimited and must not be restricted to those herein.

In this embodiment, robotic device 102 is an automatically movable robot configurable to perform certain programmed or real-time tasks, or any other desired actions. For example, the robotic device 102 is capable of autonomously navigating a medical laboratory to collect humidity information at a set of pre-defined positions to ensure laboratory humidity is within a desired value. For example, the robotic device 102 autonomously navigates around a location to collect data according to its pre-defined schedule, or may be moved via receipt of instructions from another device, such as a remote controller. In one example, a lights out operation may be performed by the robotic device 102, in which the robotic device 102 automatically navigates the facility and collects data measurements while the facility is not in use. For example, the robotic device may navigate a 65,000 square foot facility in nine days of runtime.

Robotic device 102 collects data within a facility or a specific location, including but not limited to, environmental information such as temperature, humidity and air flow; identification information such as barcodes, and Radio Frequency Identification (RFID) tags (either active or passive) etc. Also, the data to be collected may vary according to facilities or locations where the robotic device 102 may collect data, users' requirements, or any other purposes. The data collected may also be in various formats. For example, the data may be digital or analog data; one, two or three dimensional (2D, 3D) data; or images. In one embodiment, barcode information may be collected by a barcode scanner mounted to the robotic device 102 or may be collected as an image by use of a high resolution camera through which the barcode may be read and evaluated by a separate device at the same or different locations.

In one embodiment, the robotic device 102 is provided with a 3D map of a facility where the robotic device 102 will navigate and collect data. While collecting data at different positions within the facility, the robotic device 102 records the 3D information regarding each position where data is collected via reference from the 3D map of the facility. The collected data may be related to location information and timestamp information, which provide more complete information for future analysis and references. Alternatively, the collected data may be analyzed at real-time as the data is being collected by robotic device 102.

When robotic device 102 collects the data, it transmits the collected data to a data processing system 104 via a connection 106. In one embodiment, data processing system 104 may be a personal computer, a laptop computer, or any other device capable of communicating with robotic device 102 via a wired or wireless connection. Also, in this embodiment, connection 106 may be a wired connection or a wireless connection using a standard wireless communication protocol, such as, but not limited to, 802.11b or 802.11g protocol.

Data processing system 104 provides management and control of operations of the robotic device 102 and communications between the robotic device 102 and other applicable entities. Data processing system 104 may configure a collection task that the robotic device 102 is to perform and control for execution and performance of the collection task. In one embodiment, data processing system 104 may control the specific data the robotic device 102 may collect and/or record temperature and/or humidity with location information. Also, data processing system 104 may control where the robotic device 102 collects the data such as providing boundaries of an area the robotic device 102 may navigate or navigating routes.

In addition, data processing system 104 may control when or how often the robotic device 102 may collect the data and whether the robotic device 102 is to directly communicate the collected data to another entity such as a server 108 and the format of the collected data such as, but not limited to, digital data. Furthermore, data processing system 104 provides an interface between a user and the robotic device 102 for controlling operations of the robotic device 102 such as those mentioned above.

Data processing system 104 may further control the data communication of the robotic device 102 including, but not limited to, where the collected data may be communicated to, for example, server 108, and when or how often the data may be communicated. In addition, data processing system 104 may control whether a robotic device 102 should report its collecting status and current position during a collecting task or after the task has been completed. Data processing system 104 may further control whether the robotic device 102 returns to its starting position or to a different position after the robotic device 102 completes the collection task.

Once the collected data is received from robotic device 102, data processing system 104 forwards the collected data to server 108 for processing and analysis. In one embodiment, server 108 may be implemented on an enterprise platform, such as Microsoft® Windows Server®. Server 108 also comprises at least one software application for processing and analyzing data collected from the robotic device 102. The at least one software application may be a multi-tier software application created using a variety of programming languages, for example, but not limited to, Java or C++.

Server 108 provides processing and analysis of the collected data using the at least one software application. The analysis performed by server 108 includes determining the temperature, humidity, air flow, and other conditions of any specific location and mapping the condition for each specific location based on a grid of the map. In addition, server 108 may provide various reports based on the data collected at various locations. Server 108 may store collected data received from data processing system 104 in a data storage, such as database 110. One example of database 110 is a relational database, such as a Microsoft® SQL Server®. In one embodiment, server 108 processes and analyzes the collected data at real-time as the data is being collected by the robotic device 102. Alternatively, server 108 processes and analyzes the data after the robotic device 102 completes its tasks and after the collected data has been stored in database 110.

Instead of sending the collected data to data processing system 104, robotic device 102 may send the collected data directly to server 108 via connection 112. Connection 112 may be a wired connection or a wireless connection using a standard wireless communication protocol, such as 802.11b or 802.11g protocol. In this embodiment, in addition to processing, analyzing, and reporting collected data, server 108 may perform various functions of data processing system 104, including providing management and control of operations of the robotic device 102 and communications between the robotic device 102 and other applicable entities. Server 108 may also provide an interface between a user and the robotic device 102 for controlling operations of the robotic device 102 such as those mentioned above.

System 100 may be applied in various application environments for various purposes, such as managing asset inventory, asset change tracking, managing security, and managing or controlling environmental information. The system 100 provides various advantages such as, but not limited to, multiple tasks, reduced costs, improved accuracy of data, reliability, compliance support, security and reporting. The system 100 may be programmed to operate as scheduled by a user.

Figure 2:
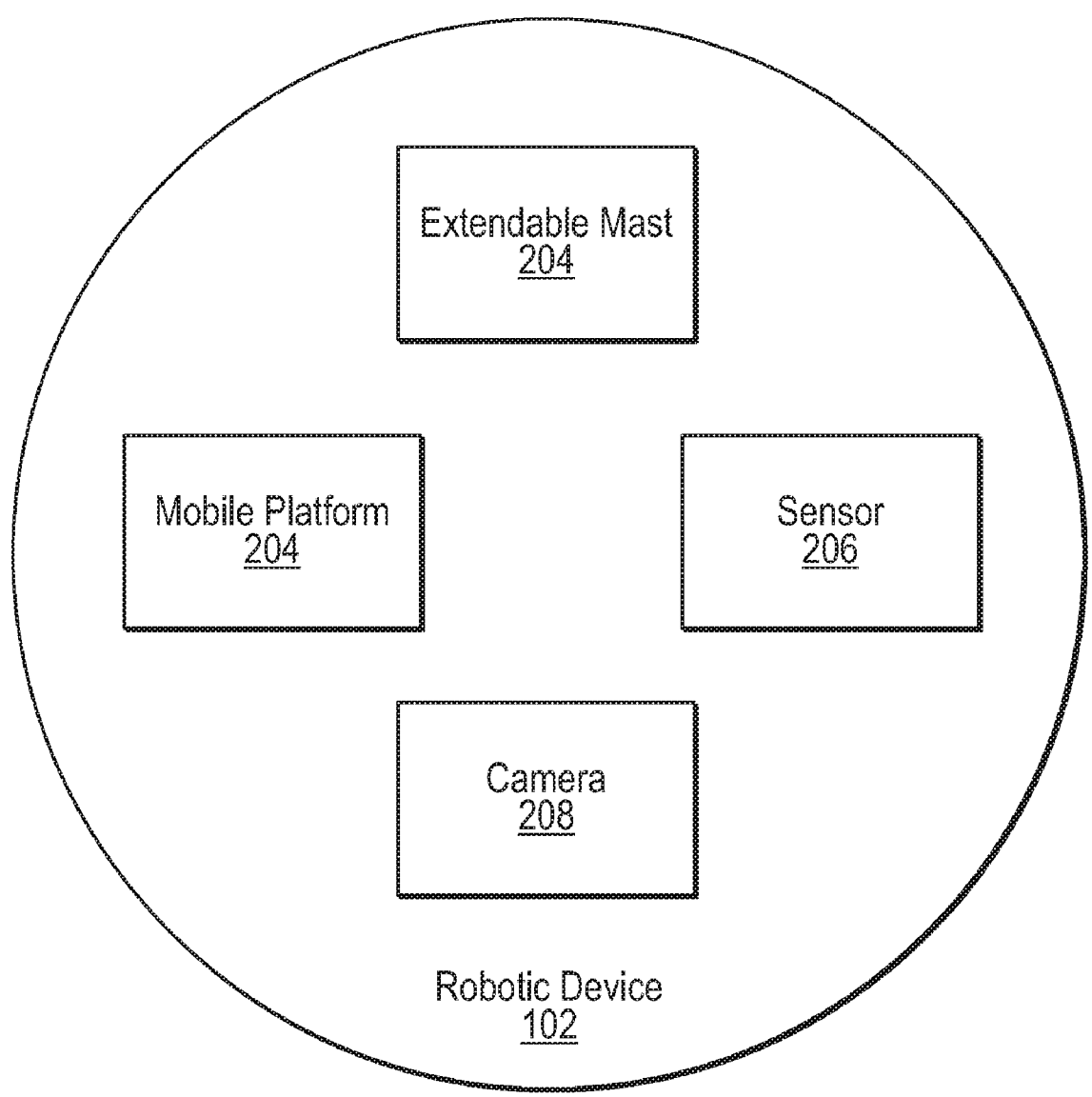
FIG. 2 a diagram of an exemplary robotic device in accordance with one embodiment of the present disclosure.

Referring to FIG. 2, a diagram of an exemplary robotic device is depicted in accordance with one embodiment of the present disclosure. In this embodiment, robotic device 102 comprises a mobile platform 202, an extendable mast 204, at least one sensor 206, and/or a camera 208. Mobile platform 202 is an autonomous mobile platform for navigation and movement of the robotic device 102 throughout a facility. An exemplary mobile platform 202 is a mobile platform such as PatrolBot® provided by Mobile Robots, Inc.

Mobile platform 202 has the ability to create a map of a facility in which the robotic device 102 collects the data. The mobile platform 202 first maps the facility by moving the robotic device 102 throughout the facility. A laser provided on the robotic device 102 maps out every location the robotic device reads and creates a map of the facility in a graphical format. In one embodiment, the robotic device 102 can read the 2D X-Y position of a location at any level twelve inches from the ground and provide a high degree of accuracy of about 10 mm. Once the map is created, a software package is loaded from the data processing system 104 or server 108 onto the mobile platform 202 along with the tasks that the robotic device 102 will perform and the specific goals for the tasks. In this way, the robotic device 102 may autonomously navigate a specific route of the facility without being controlled by a separate device and achieve predefined goals associated with the tasks.

In addition to mapping the facility, the mobile platform 202 provides other navigation and movement functions of the robotic device 102, including self-navigation, obstacle avoidance, path planning, and auto-charging. The mobile platform 202 also has a communication interface for communicating with data processing system 104 or server 108. In one embodiment, the communication interface is a wireless communication interface for receiving wireless instructions to remotely operate the robotic device 102 for individual tasks. The mobile platform 202 is also capable of receiving analog and digital inputs and can carry and provide power to a payload. For example, the mobile platform 202 may receive inputs from 4 to 20 mA and from zero to five Volt DC. In addition to the software of the mobile platform itself or the loaded software package for routing and tasking, mobile platform 202 may be loaded with other software for management of data and control of other devices, such as the extendable mast 202, at least one sensor 206 or camera 208.

The extendable mast 204 is a telescoping linear actuator having a stroke length that is much greater than its nominal height. For example, a ten pound extendable mast with a stroke length of eight feet is 24 times its nominal height of four inches. The extendable mast 204 is used to vertically elevate the sensors 206 or camera 208 to various heights throughout the facility on a grid that is predefined in the map created by the mobile platform 202. In this way, data collection may be performed at varying heights. One example of an extendable mast is a zipper mast manufactured by Geosystems, Inc., which is capable of elevating the sensors 206 or camera 208 to any height between six inches and eight feet from the floor. The exemplary extendable mast is bi-directional for upward and downward movements, and can carry a payload of up to six pounds. It is noted that other extendable masts may be used in conjunction with the mobile platform 202 without departing the spirit and scope of the present disclosure. For example, extendable masts capable of elevating the sensor or camera beyond eight feet from the floor may also be used.

In one embodiment, the extendable mast 204 is positioned on top of the robotic device 102. The extendable mast 204 may receive software instructions from data processing system 104 or server 108 via a wireless connection, such as wireless connection 106 or 112, to elevate the sensor 206 or camera 208 to a particular height. The software instructions may be loaded in the mobile platform 202 from the data processing system 104 or server 108. To receive software instructions, the extendable mast 204 comprises a multi-pair wire cable that runs through the center of the extension. The cable comprises a number of connectors at the top of the extendable mast 204 and the base of the robotic device 102 for facilitating communications between the mobile platform 202 and the extendable mast 204. The granularity of the locations within the facility the extendable mast 204 will reach may be determined by the user when the mobile platform 202 firsts creates a map of the facility. But the height at which the extendable mast 204 will reach when the robotic device 102 is deployed may be programmed on-the-fly from the server 108 or data processing system 104 via the mobile platform 202 and a wireless connection, such as connection 106 or 112.

The extendable mast 204 enables the robotic device 102 to collect location information corresponding to the specific data collected. For example, the software of the mobile platform 202 may be programmed to collect data at a particular location of the facility based on the height at which the extendable mast 204 is elevated within the grid of the map. The collected data may be saved in the database 110 along with the specific height of the extendable mast 204 and a timestamp of when the data is collected. Once all the data is collected throughout the facility, server 108 may perform processing and analysis of the collected data. Alternatively, server 108 may perform processing and analysis of the collected data at real-time as the data is being collected.

The robotic device 102 uses various collection methods and/or collection devices to collect desired data. For example, a temperature sensor (not shown) may be mounted on the robotic device 102 to measure temperature within a facility. Alternatively, a RFID tag reader (not shown) may also be provided on the robotic device 102 to read RFID tags or the like. Each collecting device is integrated with the robotic device 102 or deployed as a plug and play component that can be easily removed from and installed in the robotic device 102. The robotic device 102 further provides additional interfaces for installing additional collecting devices, thus extending or enhancing the devices collection abilities.

A plurality of sensors 206 may be positioned on the extendable mast 204 for collecting data, including humidity, temperature, and air flow. For humidity and temperature measurements, traditional sensors may be used to collect data from each of the locations (X, Y, and Z) of the facility. For air flow, a pitot tube may be used to collect air flow information. For example, a type S pitot tube may be used in low pressure differential sensors that can select bi-directional flow and pressure. By using a pitot tube, the direction of the air flow based on the X, Y, and Z axes, the position or negative air flow, and the velocity of the air flow may be determined. Once the data are collected by sensors 206, it is stored in database 110 by server 108 for further processing and analysis. For example, based on the data collected by the pitot tube, a resultant air flow velocity vector may be determined. In addition to the sensors mentioned above, other types of sensors may be positioned on top of the extendable mast 204 to collect other data without departing the spirit and scope of the present disclosure. For examples, sensors for detecting heat, smoke, and motion may be used.

In one embodiment, the robotic device 102 may collect bar codes and/or RFID tags of items/assets within a facility, together with row and rack information of each item/asset and position information of each item/asset within the facility. In this embodiment, camera 208 may be positioned on top of the extendable mast 204 to collect images for further analysis. Camera 208 may be a high resolution camera capable of taking high resolution images. High resolution images of a barcode may be taken by camera 208 to provide 3D location information of an item within the facility. In this way, location information within a specific rack or shelf located in the facility for each barcode may be collected via reference from the map of the facility.

Alternative to camera 208, an RFID reader may be used to collect RFID tags of items or assets within a facility. When collecting RFID tags, the RFID reader is used to provide 3D location information of items within the facility. In this way, location information within a specific rack or shelf located in the facility for each RFID may be collected via reference from the map of the facility. The collection distance of the RFID reader is dependent on the distance from a reference point of the RFID reader that is embedded in the extendable mast 204. Typical readable distance between the RFID reader and the RFID tag ranges from a minimum of about 6 inches to a maximum of about 60 inches.

Once the bar codes or RFID tags are collected, server 108 processes all of the data obtained and stores the data in database 110 as an inventory for later analysis. The stored data may be compared to the inventory each time new data is collected and changes in the inventory may be discovered. For example, the location information of each bar code and/or RFID collected within a facility may be compared to the location information of each bar code and/or RFID previously stored in the database 110 to identify whether an item/asset has been moved. In addition, auto-discovery of new or unknown item/asset within a facility may be performed, since new barcode or RFID will be discovered when comparisons are made between the new collection of bar codes and/or RFIDs and the collection of bar codes and/or RFIDs previously stored in the database 110. In an alternative embodiment, server 108 may process and analyze the data obtained from the robotic device 102 at real-time. Analysis of the data may be presented in various formats that are defined and selected by users.

Figure 3:
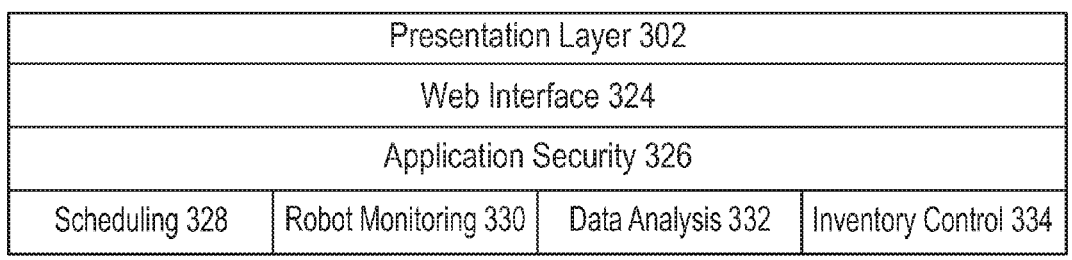
FIG. 3 is a diagram depicting a software architecture of a system for data collection and analysis using robotic devices in accordance with one embodiment of the present invention.
Figure 3:
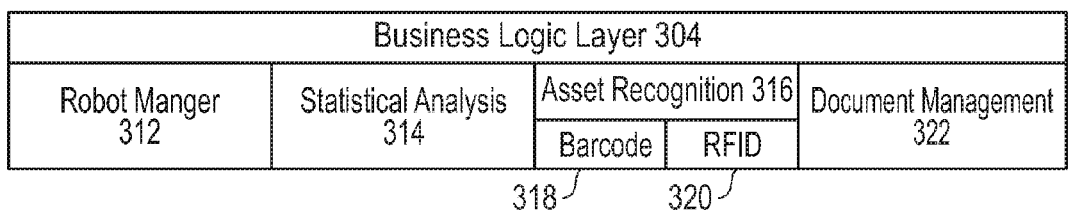
Figure 3:
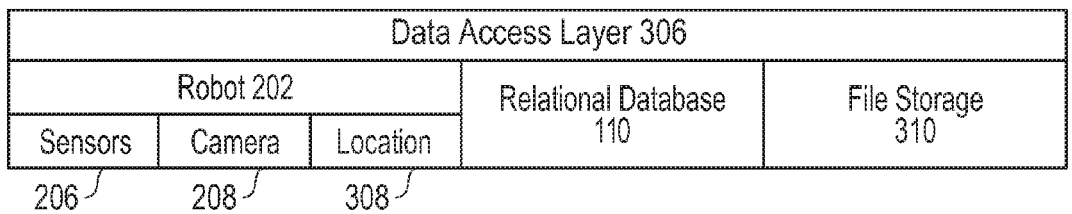

Referring to FIG. 3, a diagram illustrating a software architecture of a system for data collection and analysis using robotic devices is depicted in accordance with one embodiment of the present disclosure. In one embodiment, the software architecture 300 of the system 100 comprises three layers: a presentation layer 302, a business logic layer 304, and a data access layer 306. The data access layer 306 provides an interface for collecting data and providing access to data that is collected by the robotic device 102. The data access layer 306 comprises a robotic mobile platform 202, sensors 206, camera 208, and location collection 308 for collecting data. The data access layer 306 also comprises a relational database 110 and file storage 310 for storing software instructions or applications of the robotic device 102.

Sensors 206 takes measurements of air flow, humidity, temperature, and other conditions of the facility. In one embodiment, sensors 206 are capable of taking measurements from four to twenty mA or zero to five Volt DC. After measurements are taken by sensors 206, the mobile platform 202 forwards the data to server 108, which then stores the data in relational database 110. Database 110 stores other real-time data collected by the robotic device 102, for example, positional information of each sensor measurements based a grid on the map of the facility. A position of a sensor measurement is represented by X axis of the grid on the map, Y axis of the grid on the map, and Z axis or the height of the extendable mast from the floor. Furthermore, database 110 stores a timestamp of data collection for each piece of data collected. In this way, analysis of the collected data may be performed for any given period of time.

The business logic layer 304 provides business logic for management and operations of the robotic device 102 as well as processing and analysis of the collected data. The business logic layer 304 comprises a robot manager 312 for management and operations of the robotic device 102, statistical analysis 314 for analysis of the collected data, asset recognition 316 for managing assets based on collected barcodes 318 and RFIDs 320, and a document management 322 for managing reports that are generated from the collected data.

The presentation layer 302 provides a user interface for user control of the robotic device 102 and presentation of the collected data. In one embodiment, the presentation layer 302 comprises a Web interface 324 for user to control operations of the robotic device 102 and view presentation of data analysis at real-time. For example, the Web interface 324 allows the user to view a map of the facility created by the mobile platform 202 as the robotic device 102 is moving through the facility and allows the user to zoom in and out of the map of the facility. The Web interface 324 also allows the user to navigate the robotic device 102 at real-time. For example, a user may click on the map of the facility to send the robotic device to a specific location. The Web interface 324 also allows the user to view images collected by the robotic device 102 using a camera 208, such as a high resolution camera.

Furthermore, the Web interface 324 provides various reports to the user based on analysis performed by server 108 from the collected data. Examples of reports generated by the server 108 and presented on the Web interface 324 include temperature maps, air flow depiction maps, humidity maps, trending of data across any given time period for humidity, temperature, and air flow. These reports may be presented in a 2D or 3D graphical formats.

Application security 326 is also provided in presentation layer 302 to provide security access to the robotic device 102 and its software applications. Scheduling 328 provides an interface for user to schedule one or more tasks to be performed by the robotic device 102, specify predefined goals for the one or more tasks, and the specific route within the facility to be taken by the robotic device 102 to accomplish the one or more tasks.

Presentation layer 302 also comprises robot monitoring 330 for monitoring results of robotic operations. For example, robot monitoring 330 receives feedback from the robotic device 102 and determines whether it has achieved the predefined goals. Robot monitoring 330 also allows the user to view video feed from the robotic device 102 and listen for audio that are recorded with a microphone positioned on the extendable mast. Robot monitoring 330 also allows the user to send speech to the robotic device and project the speech through a set of speaker positioned on the robotic device 102. Furthermore, robot monitoring 330 allows the user to send software instructions to the robotic device 102 to drive the extendable mast to a specific height.

Presentation layer 302 further comprises data analysis 332 for analyzing the collected data. For example, air flow data for each location (X, Y, and Z) that is stored in the database 110 may be retrieved and calculations may be performed on the server 108 to determine a resultant air flow velocity vector. In one embodiment, the resultant air flow velocity vector may be determined based on the direction and speed of the air flow measured by a type S pitot tube. The resultant air flow velocity vector may then be stored in database 110 for later analysis and presentation.

Data analysis 332 provides statistical interpretation of the data by giving 2D or 3D graphs and/or maps, trending of the data or reports concerning the data, such as comparison, changes or ranges of the data, for users' further interpretation or reference. If the data is presented in a 3D graphical map, the 3D graphical map may be rotated by the user for different angles or aspects of viewing and interpretation.

For example, air flow direction and velocity or speed may be presented in a 2D graphical map at each common X, Y, or Z position. Alternatively, air flow direction and velocity or speed may be presented in a 3D graphical map for the entire facility with rotating views available. Similarly, temperature, humidity and other conditions of each location (X, Y, Z) of the facility may be presented in a 2D graphical map at each common X, Y, or Z position. Alternatively, temperature, humidity and other conditions of the entire facility may be presented in a 3D graphical map with rotating views available. From the 2D or 3D graphical map, a user may accurately identify hot or cold spots or high or low humidity areas in the facility.

Presentation layer 302 further comprises inventory control 334 for collecting, locating, and auto-discovering inventory of at least one item in a facility. Various method may be used to collect and locate inventory. In one embodiment, a camera 208, such as a high resolution camera, is positioned on top of the extendable mast to take images of equipment in a facility. The images are collectively analyzed by server 108 to provide a holistic view of all the equipment in the facility at a particular time. Alternatively, a barcode reader 318 may be positioned on top of the extendable mast to read barcode tags of equipment in a facility. In another embodiment, an RFID reader may be positioned on top of the extendable mast to locate equipment in a facility.

Software architecture 300 may also allow for the data to be exported or interfaced to other systems that a user may have in place for further detailed analysis of any desired data. The software architecture 300 may further comprise interfaces for integrating with other systems or applications that are available and/or on a custom basis, such as a Heating, Ventilating, and Air Conditioning (HVAC) system control, an inventory management system or an environmental analysis application.

Figure 4:
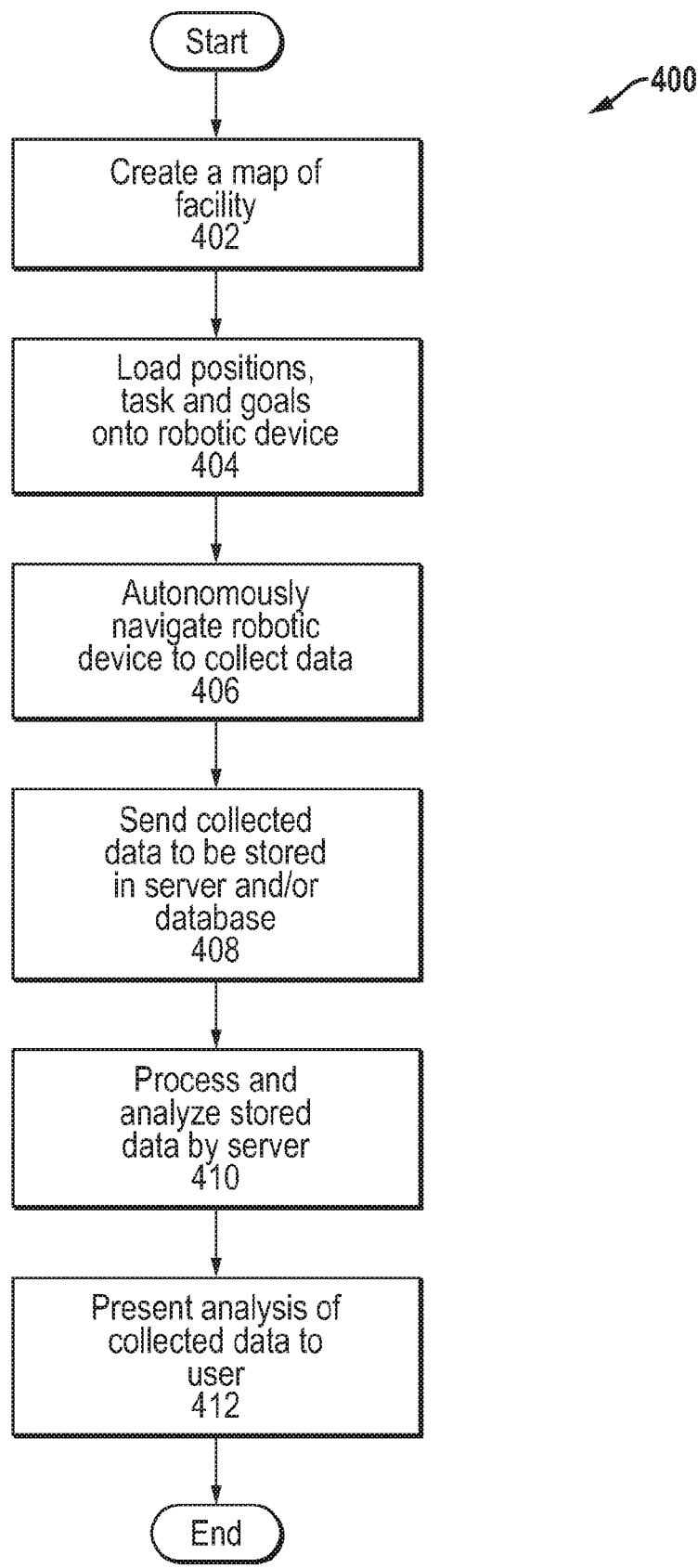
FIG. 4 is a flowchart of a process for data collection and analysis using robotic devices in accordance with one embodiment of the present disclosure.

Referring to FIG. 4, a flowchart of a process for data collection and analysis using robotic devices 102 is depicted in accordance with one embodiment of the present disclosure. In one embodiment, process 400 may be implemented within system 100 under a software architecture, such as software architecture 300. Process 400 begins at step 402 to create a map of facility. For example, a 3D map of the facility may be created by navigating the robotic device 102 and recording position information with a laser mounted on the robotic device 102. Next, process 400 continues to step 404 to load positions, at least one task and at least one goal associated with the at least one task onto the robotic device 102. For example, a software package may be loaded from the data processing system 104 or server 108 onto the mobile platform 202 of the robotic device 200 via a wireless connection, such as connection 106 or 112.

Process 400 then continues to step 406 to autonomously navigate the robotic device 102 to collect data according to the at least one task and at least one goals associated with the at least one task. More details regarding step 406 are discussed with reference to FIG. 6 below. Process 400 then continues to step 408 to send the collected data to be stored in the server and/or database. For example, the mobile platform 202 may send collected data via connection 106 to data processing system 104, which then forwards the data to server 108 to be stored in database 110.

Process 400 then continues to step 410 to process and analyze the stored data by the server 108. For example, the server 108 may analyze collected air flow measurements collected by the robotic device 102. More details regarding step 410 are discussed with reference to FIGS. 7, 8, and 9 below. Process 400 then completes at step 412 to present the analysis of the collected data to the user. For example, a 2D or 3D graphical map of the facility with air flow information may be presented to the user via a Web interface 324.

Figure 5:
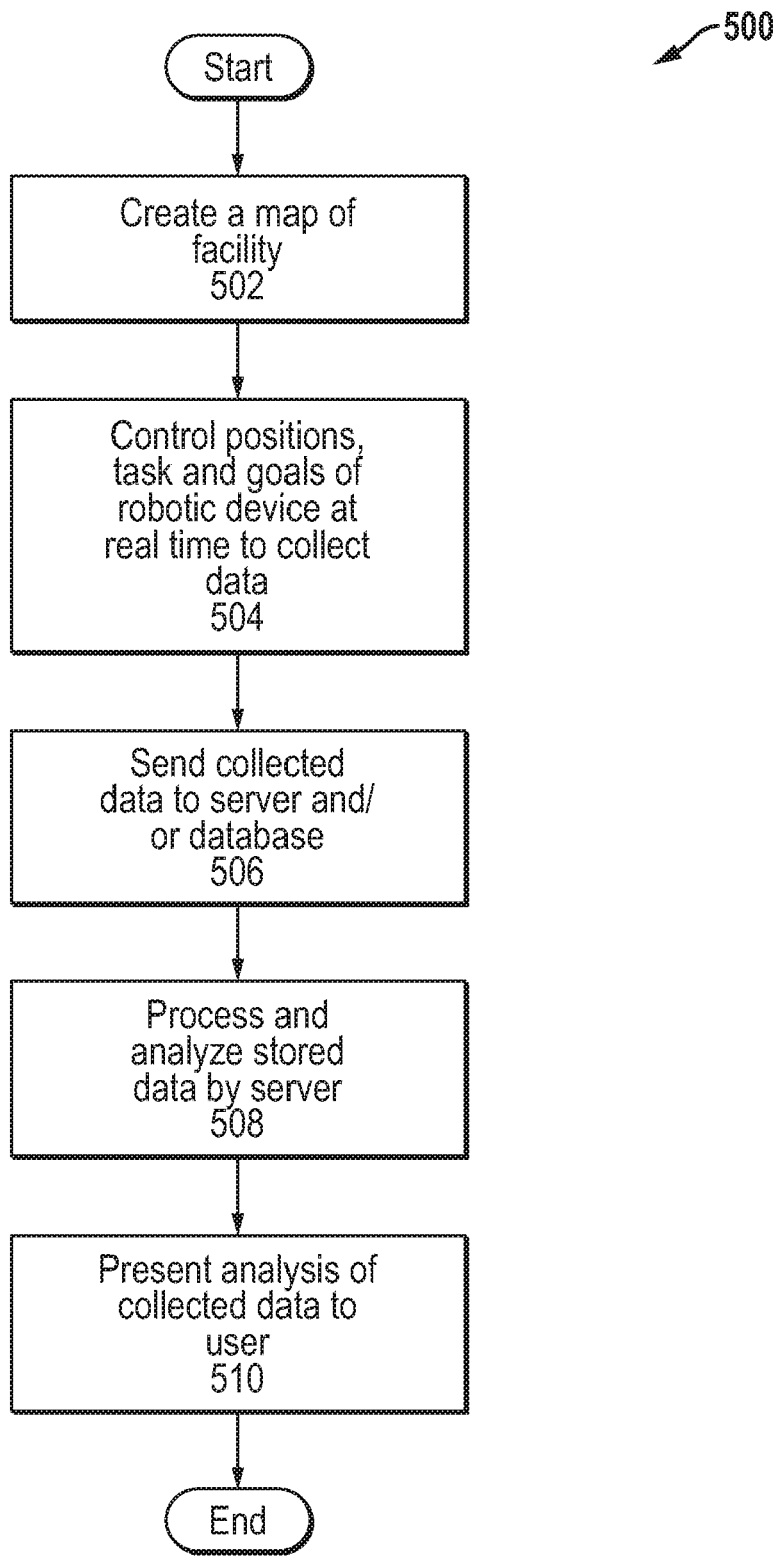
FIG. 5 is a flowchart of a process for data collection and analysis using robotic devices in accordance with an alternative embodiment of the present disclosure.

In addition to loading the positions, tasks and goals beforehand and analyzing data after the robotic device 102 has completed its tasks, operations of the robotic device 102 may be controlled by the user at real-time and analysis and presentation of the collected data may be presented to the user at the same time. Referring to FIG. 5, a flowchart of a process for data collection and analysis using robotic devices 102 is depicted in accordance with an alternative embodiment of the present disclosure. In one embodiment, process 500 may be implemented within system 100 under a software architecture, such as software architecture 300.

Process 500 begins at step 502 to create a map of the facility. For example, a 3D map of the facility may be created by navigating the robotic device 102 and recording position information with a laser mounted on the robotic device 102. Next, process 500 continues to step 504 to control positions, at least one task and at least one goal associated with the at least one task of the robotic device 102 at real-time to collect data. For example, a user may send an instruction to navigate the robotic device 102 to a specific location to measure temperature of the specific location by via a Web interface 324. In this way, the user may control operations of the robotic device 102 and collect data at real-time.

Process 500 then continues to step 506 to send the collected data to be stored in the server 108 and/or database 110. For example, the mobile platform 202 may send collected data via connection 106 to data processing system 104, which then forwards the data to server 108 to be stored in database 110. Process 500 then continues to step 508 to process and analyze the collected data by the server 108. For example, the server 108 may analyze air flow measurements collected by the robotic device 102. Process 500 then completes at step 510 to present the analysis of the collected data to the user. For example, a 2D or 3D graphical map of the facility with air flow information may be presented to the user via a Web interface 324. More details regarding step 510 are discussed with reference to FIGS. 7, 8, and 9 below.

Figure 6:
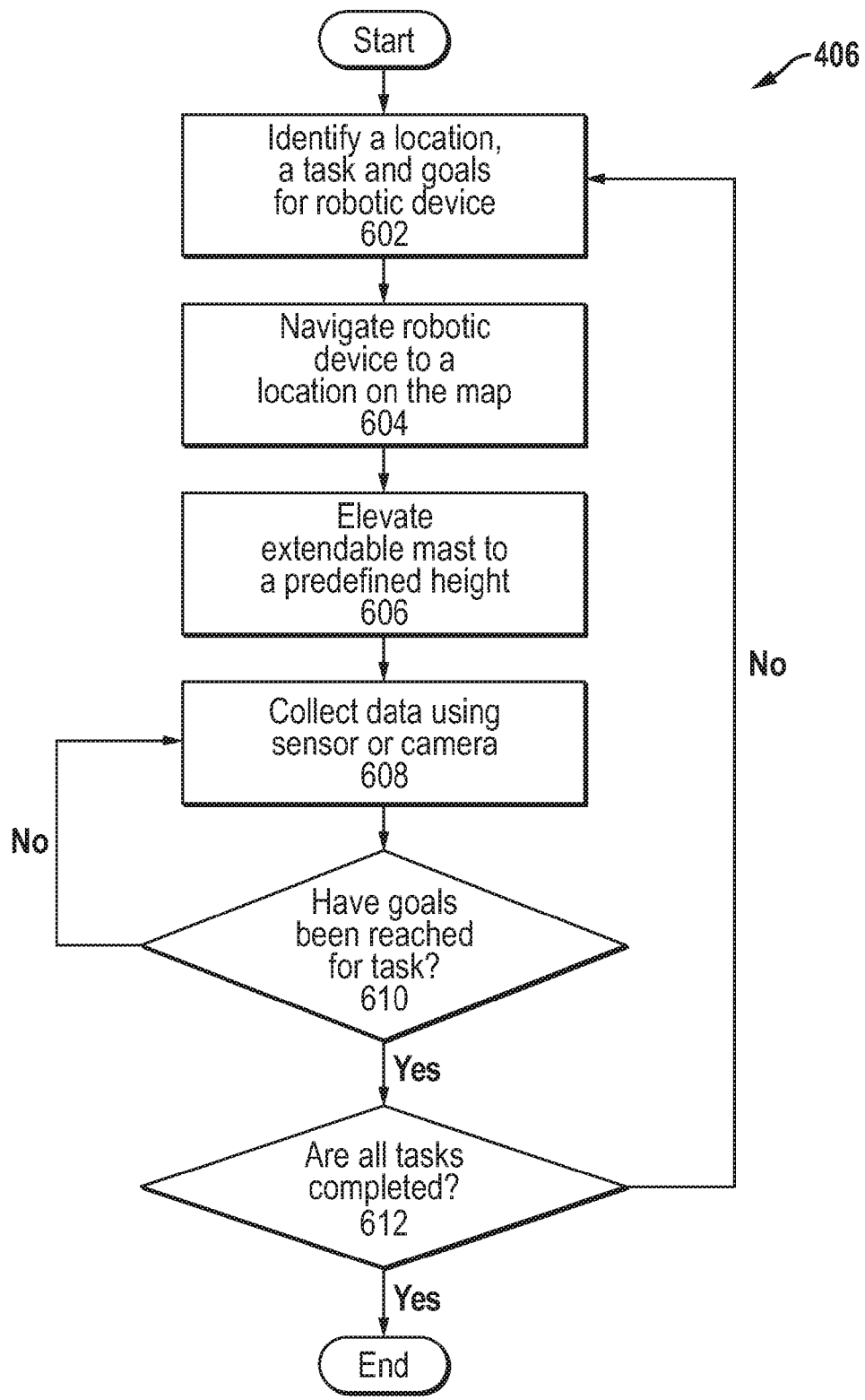
FIG. 6 is a flowchart of a process for autonomously navigating the robotic device to collect data in accordance with one embodiment of the present disclosure.

Referring to FIG. 6, a flowchart of a process for autonomously navigating the robotic device 102 to collect data is depicted in accordance with one embodiment of the present disclosure. In one embodiment, process 406 may be implemented within system 100 under a software architecture, such as software architecture 300.

Process 406 begins at step 602 to identify a location, at least one task and at least one goals associated with the at least one task for the robotic device 102. For example, the mobile platform 202 may identify such information from a software package that is pre-loaded onto the robotic device 102. Process 406 then continues to step 604 to navigate the robotic device 102 to the identified location on the map of the facility. Process 406 then continues to step 606 to elevate the extendable mast 204 to a predefined height. For example, the mobile platform 202 may elevate the extendable mast 204 to the height as defined by the Z axis of the identified location. Process 406 then continues to step 608 to collect data using sensor 206 or camera 208. For example, the mobile platform 202 may take air flow measurements from a type S pitot tube sensor (not shown). If camera 208 is used to collect data, high resolution images may be taken.

Process 406 then continues to step 610 to determine if the at least one goal has been reached for the specified task. For example, if a temperature measurement is taken successfully by a temperature sensor, such as sensor 206. If the at least one goal has not been reached, process 406 returns to step 608 to continue to collect data. If the at least one goal has been reached, process 406 continues to step 612 to determine if the at least one task has been completed. For example, the mobile platform 202 may determine whether all temperature measurements as defined by at least one task have been collected by the sensor. If the at least one task has not been completed, process 406 returns to step 602 to identify a new location, a new task, and goals associated with the new task for the robotic device. If the at least one task has been completed, process 406 terminates.

Figure 7:
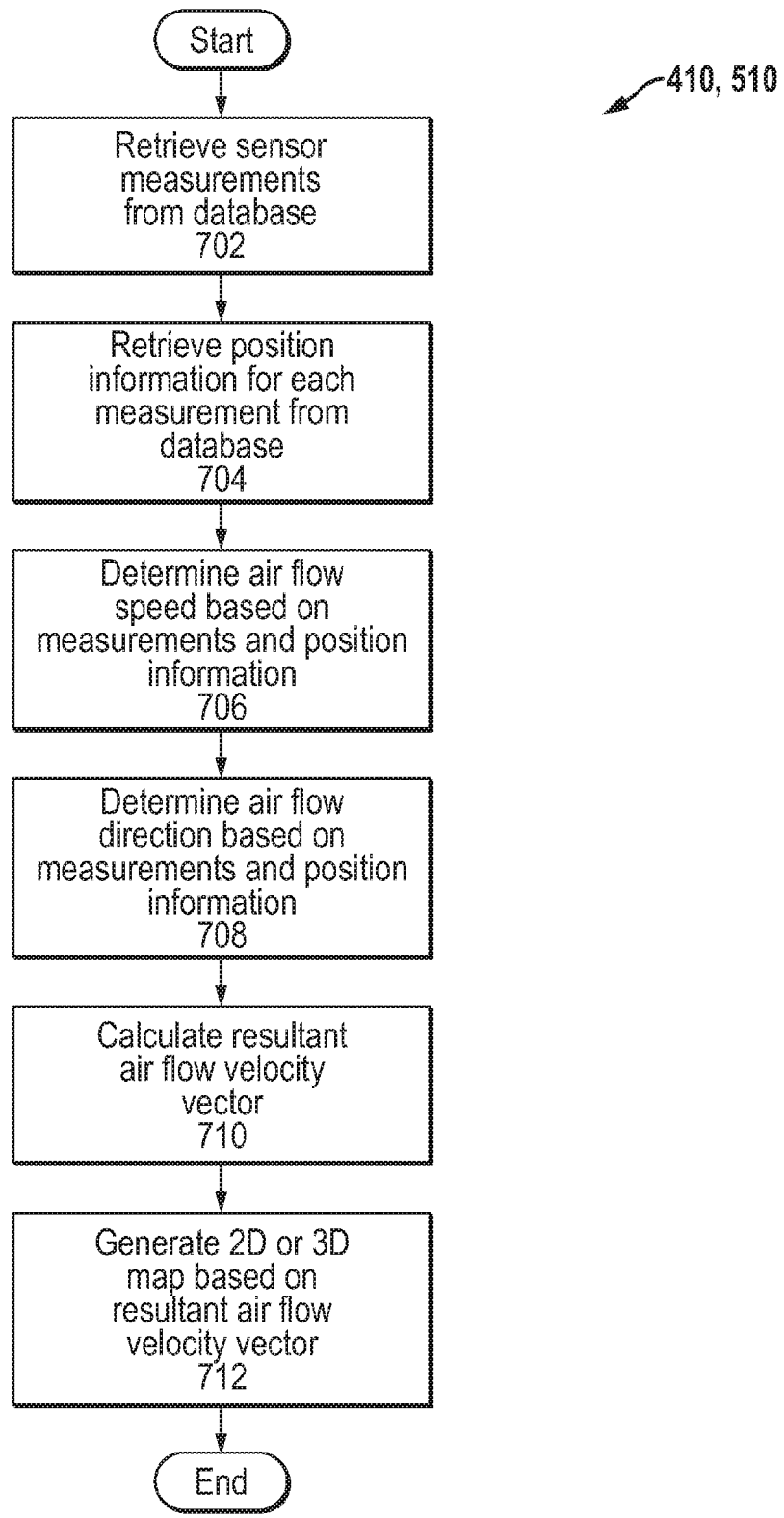
FIG. 7 is a flowchart of a process for processing and analyzing the collected data by the server in accordance with one embodiment of the present disclosure.

Referring to FIG. 7, a flowchart of a process for processing and analyzing the collected data by the server is depicted in accordance with one embodiment of the present disclosure. In one embodiment, process 410 or 510 (as shown in FIG. 4 and FIG. 5 respectively) may be implemented within system 100 under a software architecture, such as software architecture 300.

Process 410 or 510 begins at step 702 to retrieve sensor measurements from the database. For example, server 108 may retrieve air flow measurements from the database 110. Process 410 or 510 continues to step 704 to retrieve position information for each measurement from the database 110. For example, the X, Y, Z position for a particular air flow measurement may retrieved from the database 110. In addition to position information, timestamp of when the air flow measurement is made may be retrieved from the database 110.

Process 410 or 510 then continues to step 706 to determine air flow velocity or speed based on the measurements and position information retrieved from the database 110. Process 410 or 510 then continues to step 708 to determine air flow direction based on the measurements and position information retrieved from the database. Process 410 or 510 then continues to step 710 to calculate a resultant air flow velocity vector. For example, the server 108 may perform calculations of the resultant air flow velocity vector based on the air flow speed and direction. Process 410 or 510 then completes at step 712 to generate a 2D or 3D graphical map based on the resultant air flow velocity vector. For example, a 2D air flow map may be generated at each X, Y position and a 3D air flow map may be generated for the entire facility.

Figure 8:
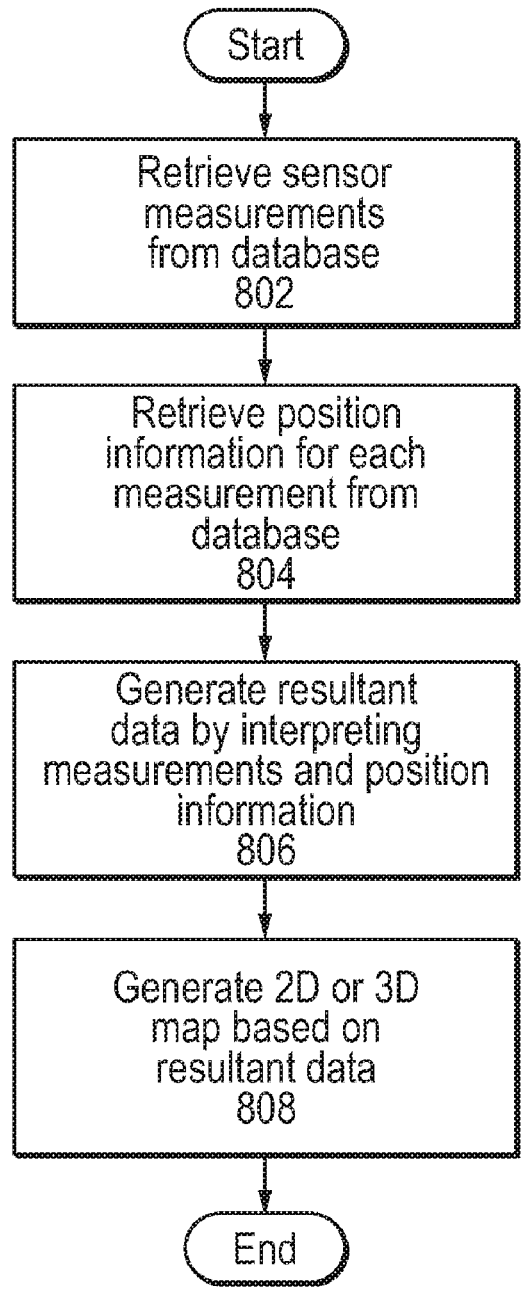
FIG. 8 is a flowchart of a process for processing and analyzing the collected data by the server in accordance with an alternative embodiment of the present disclosure.

In addition to air flow, temperature, humidity and other conditions collected may be processed and analyzed by the server 108. Referring to FIG. 8, a flowchart of a process for processing and analyzing the collected data by the server 108 is depicted in accordance with an alternative embodiment of the present disclosure. In one embodiment, process 410 or 510 may be implemented within system 100 under a software architecture, such as software architecture 300.

Process 410 or 510 begins at step 802 to retrieve sensor measurements from the database 110. For example, server 108 may retrieve temperature measurements from the database 110. Process 410 or 510 then continues to step 804 to retrieve position information for each measurement from the database. For example, the X, Y, Z position for a particular temperature measurement may be retrieved from the database 110. In addition to position information, a timestamp of when the temperature measurement is made may be retrieved from the database 110.

Process 410 or 510 continues to step 806 to generate resultant data by interpreting the measurements and position information retrieved from the database 110. For example, an average temperature for a set of positions during a period of time in the facility may be generated by interpreting sensor 206 measurements and position information. Process 410 or 510 then completes at step 808 to generate a 2D or 3D map based on the resultant data. For example, a 2D temperature map may be generated at a set of X, Y, or Z positions and a 3D temperature map may be generated for the entire facility.

Figure 9:
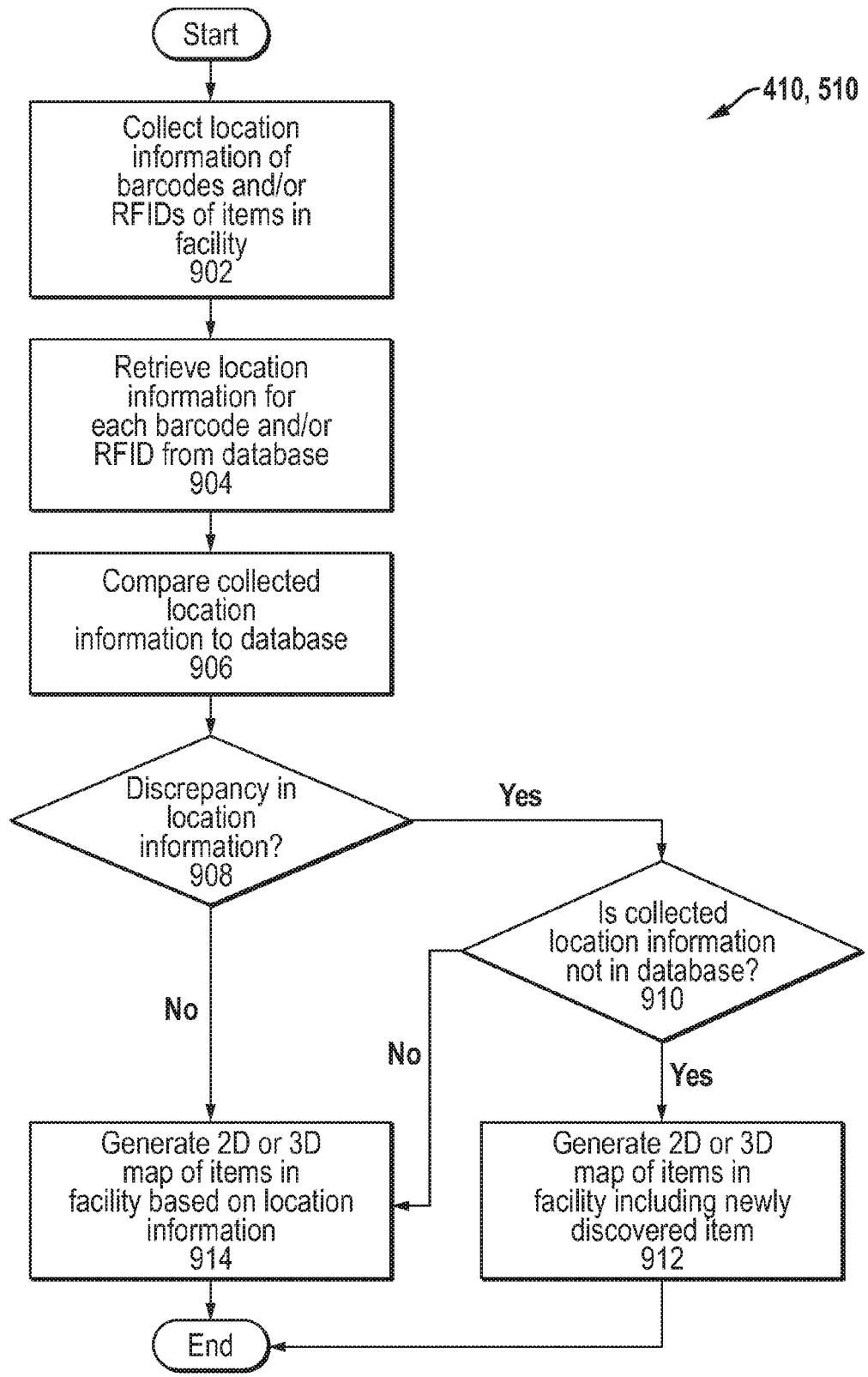
FIG. 9 is a flowchart of a process for processing and analyzing the collected data by the server in accordance with another embodiment of the present disclosure.

As discussed above, inventory in a facility may be collected, located and discovered based on the location information collected by the robotic device and stored in the database 110. Referring to FIG. 9, a flowchart of a process for processing and analyzing the collected data by the server is depicted in accordance with another embodiment of the present disclosure. In one embodiment, process 410 or 510 may be implemented within system 100 under a software architecture, such as software architecture 300.

Process 410 or 510 begins at step 902 to collect location information of at least one bar code and/or Radio Frequency Identification (RFID) of at least one item in the facility. For example, camera 208 may be used to collect images of the bar code of equipment on a rack or stack in the facility. Next, process 410 or 510 continues to step 904 to retrieve location information for each bar code and/or RFID of the at least one item from the database 110. Process 410 or 510 then continues to step 906 to compare the collected location information to the location information retrieved from the database 110. Processing 410 or 510 then continues to step 908 to determine if a discrepancy exists between the collected location information and the location information retrieved from the database 110.

If no discrepancy exists between the collected location information and the location information retrieved from the database 110, process 410 or 510 continues to step 914 to generate a 2D or 3D graphical map of at least one item in the facility based on the location information. However, if a discrepancy exists between the collected location information and the location information retrieved from the database 110, process 410 or 510 continues to step 910 to determine if the collected location information is not in the database. This means that a new item has been discovered from the new data collection and inventory of the facility needs to be updated. If the collected location information is not in the database, process 410 or 510 continues to step 912 to generate a 2D or 3D graphical map of at least one item in the facility including the newly discovered item.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for data collection and analysis using robotic devices comprising:
   creating a map of a facility;
   loading at least one position and at least one task onto a robotic device;
   autonomously navigating the robotic device to the at least one position to collect data;
   controlling the at least one position and the at least one task of the robotic device in real-time to collect the data;
   sending the data to a database for storage;

processing and analyzing the data by a server; and
presenting analysis of the data to a user, wherein the processing and analyzing the data by a server comprises:
retrieving at least one measurement from the database;
retrieving at least one position information for each of the at least one measurement from the database;
determining an air flow speed based on the at least one measurement and the at least one position information; and
determining an air flow direction based on the at least one measurement and the at least one position information.

2. The method of claim 1, wherein autonomously navigating the robotic device to the at least one position to collect data comprises:
identifying at least one location, the at least one task, and at least one goal associated with the at least one task for the robotic device;
navigating the robotic device to the at least one location on the map;
elevating an extendable mast to a predefined height; and
collecting data using at least one sensor positioned on top of the extendable mast.

3. The method of claim 2, further comprising:
determining if the at least one goal has been reached for the at least one task; and
continuing to collect data if the at least one goal has not been reached for the at least one task.

4. The method of claim 2, further comprising:
determining if the at least one task has been completed if the at least one goal has been reached for the at least one task.

5. The method of claim 2, further comprising:
providing a camera positioned on top of the extendable mast; and
collecting at least one image of at least one bar code of at least one item in the facility using the camera.

6. The method of claim 2, further comprising:
providing a Radio Frequency Identification (RFID) reader positioned on top of the extendable mast; and
collecting at least one RFID tag of at least one item in the facility using the RFID reader.

7. The method of claim 1, further comprising:
calculating a resultant air flow velocity vector based on the air flow speed and the air flow direction; and
generating a graphical map based on the resultant air flow velocity vector.

8. The method of claim 1, wherein processing and analyzing the data by a server further comprises:
retrieving at least one measurement from the database;
retrieving at least one position information for each of the at least one measurement from the database;
generating a resultant data by interpreting the at least one measurement and the at least one position information; and
generating a graphical map based on the resultant data.

9. The method of claim 1, wherein sending the data to a database for storage comprises:
sending the data from the robotic device to a data processing system via a wireless connection;
sending the data from the data processing system to a server; and
forwarding the data from the server to the database for storage.

10. The method of claim 1, wherein sending the data to a database for storage comprises:
sending the data from the robotic device to the server via a wireless connection; and
forwarding the data from the server to the database for storage.

11. The method of claim 1, wherein controlling at least one position and at least one task of a robotic device in real-time to collect data comprises:
presenting the map to a user on a Web interface;
allowing the user to zoom in or out of the map;
allowing the user to click on the map to identify a specific location; and
sending the robotic device to the specific location.

12. The method of claim 1, further comprising:
associating a timestamp with the data collected; and
storing the timestamp in the database.

13. The method of claim 1, wherein processing and analyzing the data by a server further comprises:
collecting location information of at least one bar code or at least one Radio Frequency Identification (RFID) of at least one item in the facility;
retrieving location information for each of the at least one bar code or at least one RFID from the database;
comparing collected location information and location information from the database;
determining if a discrepancy exists between the collected location information and location information from the database; and
determining if the collected location information is not in the database.

14. A non-transitory computer readable medium comprising computer readable code for implementing the method comprising the steps:
creating a map of a facility;
loading at least one position and at least one task onto a robotic device;
autonomously navigating the robotic device to the at least one position to collect data;
controlling the at least one position and the at least one task of the robotic device in real-time to collect the data;
sending the data to a database for storage;
processing and analyzing the data by a server; and
presenting analysis of the data to a user, wherein the processing and analyzing the data by a server comprises:
retrieving at least one measurement from the database;
retrieving at least one position information for each of the at least one measurement from the database;
determining an air flow speed based on the at least one measurement and the at least one position information; and
determining an air flow direction based on the at least one measurement and the at least one position information.

* * * * *